US006978700B2

(12) United States Patent
Chen

(10) Patent No.: US 6,978,700 B2
(45) Date of Patent: Dec. 27, 2005

(54) WRENCH ASSEMBLY

(76) Inventor: Terence Chen, No. 325, Yung Ching Road, Tung Shan Hsiang, Lo Tung Town,Yi Lan Hsien (TW)

( * ) Notice: Subject to any disclaimer, the term of this patent is extended or adjusted under 35 U.S.C. 154(b) by 0 days.

(21) Appl. No.: 11/050,969

(22) Filed: Feb. 4, 2005

(65) Prior Publication Data

US 2005/0126346 A1 Jun. 16, 2005

Related U.S. Application Data

(63) Continuation-in-part of application No. 10/396,167, filed on Mar. 24, 2003.

(51) Int. Cl.$^{7}$ .......................... B25B 13/46; B25G 3/00; F16D 11/06

(52) U.S. Cl. ................... 81/60; 81/61; 81/62; 403/300; 192/43

(58) Field of Search ................................ 81/60, 61, 62, 81/63, 63.1, 63.2, 177.1, 177.2, 177.85; 403/300; 192/41 R, 43, 43.2

(56) References Cited

U.S. PATENT DOCUMENTS

| | | | | | |
|---|---|---|---|---|---|
| 889,710 | A * | 6/1908 | Morley | | 408/121 |
| 1,040,835 | A * | 10/1912 | Adams | | 81/61 |
| 1,331,956 | A * | 2/1920 | Cross | | 81/60 |
| 1,401,828 | A * | 12/1921 | Swearingen | | 81/61 |
| 1,415,731 | A * | 5/1922 | Terry | | 81/57.29 |
| 2,696,748 | A * | 12/1954 | Relken | | 81/61 |
| 2,758,493 | A | 8/1956 | Goldwater | | |
| 5,878,635 | A * | 3/1999 | Hsieh | | 81/61 |
| 5,979,274 | A | 11/1999 | Hsieh | | |
| 6,253,646 | B1 * | 7/2001 | Chang | | 81/59.1 |
| 6,295,898 | B1 | 10/2001 | Hsieh | | |
| 6,516,689 | B1 | 2/2003 | Bates | | |
| 6,644,148 | B2 * | 11/2003 | Hu | | 81/63.2 |

* cited by examiner

*Primary Examiner*—Joseph J. Hail, III
*Assistant Examiner*—Alvin J. Grant
(74) *Attorney, Agent, or Firm*—Alan D. Kamrath; Nikolai & Mersereau, P.A.

(57) ABSTRACT

A wrench assembly includes a handle and a wrench. The handle includes a head. The wrench includes a first annular ring non-rotationally put in the head of the handle, a second gear rotationally installed in the first annular ring for engagement with a tool bit and a one-way driving device arranged between the first annular ring and the second gear so that the first annular ring can drive the second gear in a direction through the one-way driving device.

19 Claims, 17 Drawing Sheets

WRENCH ASSEMBLY

CROSS-REFERENCE

The present application is a continuation-in-part application of U.S. patent application Ser. No. 10/396,167 filed Mar. 24, 2003 of which the disclosure is incorporated herein.

BACKGROUND OF INVENTION

1. Field of Invention

The present invention relates to a wrench assembly consisting of a handle and a wrench disclosed in U.S. Patent Publication No. 2004-0187648 A.

2. Related Art

According to U.S. Patent Publication No. 2004-0187648 A, a wrench 1 includes a first gear 10, a second gear 20 and a one-way driving device 30. The first gear 10 is provided for contact with a user's hand. The second gear 20 is put in the first gear 10 for engagement with a tool bit 70. The one-way driving device 30 is used between the first gear 10 and the second gear 20 so that the first gear 10 can drive the second gear 20 in a direction through the one-way driving device 30. A tab 40 is pivotally connected with the first gear 10 between a lying position and a standing position. In the standing position, the tab 40 is operable to rotate the first gear 10. The connection of the tab 40 with the first gear 10, however, may not stand a large force. Alternatively, a handle 71 is connected with the first gear 10. The handle 71 is operable to rotate the first gear 10. However, the connection of the handle 71 with the first gear 10 is not convenient enough.

The present invention is therefore intended to obviate or at least alleviate the problems encountered in the art.

SUMMARY OF INVENTION

A wrench assembly consists of a handle and a wrench. The handle includes a head. The wrench includes a first gear non-rotationally put in the head of the handle, a second gear rotationally installed in the first gear for engagement with a tool bit and a one-way driving device arranged between the first gear and the second gear so that the first gear can drive the second gear in a direction through the one-way driving device.

The advantage of the wrench assembly according to the present invention is that the connection of the head of the handle with the first gear of the wrench can stand a large force.

Another advantage of the wrench assembly according to the present invention is that the connection of the head of the handle with the first gear of the wrench is convenient.

Other advantages and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF EMBODIMENTS

Figure 1:
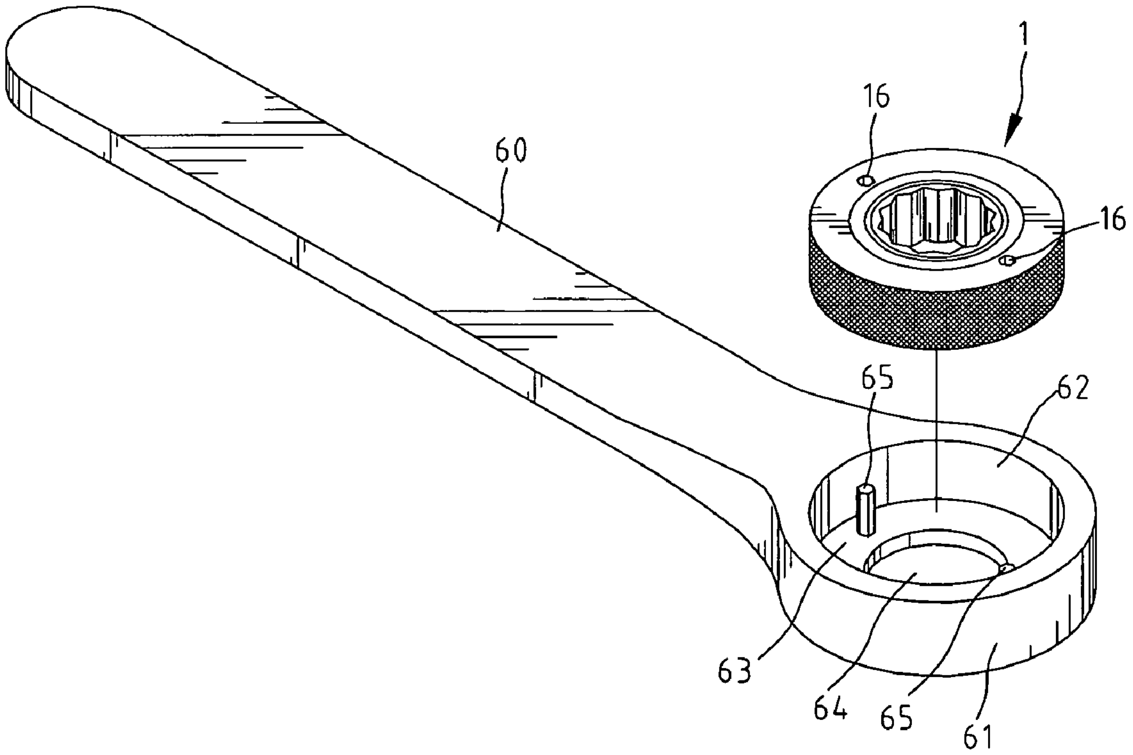
FIG. 1 is an exploded view of a wrench assembly according to a first embodiment of the present invention.
Figure 2:
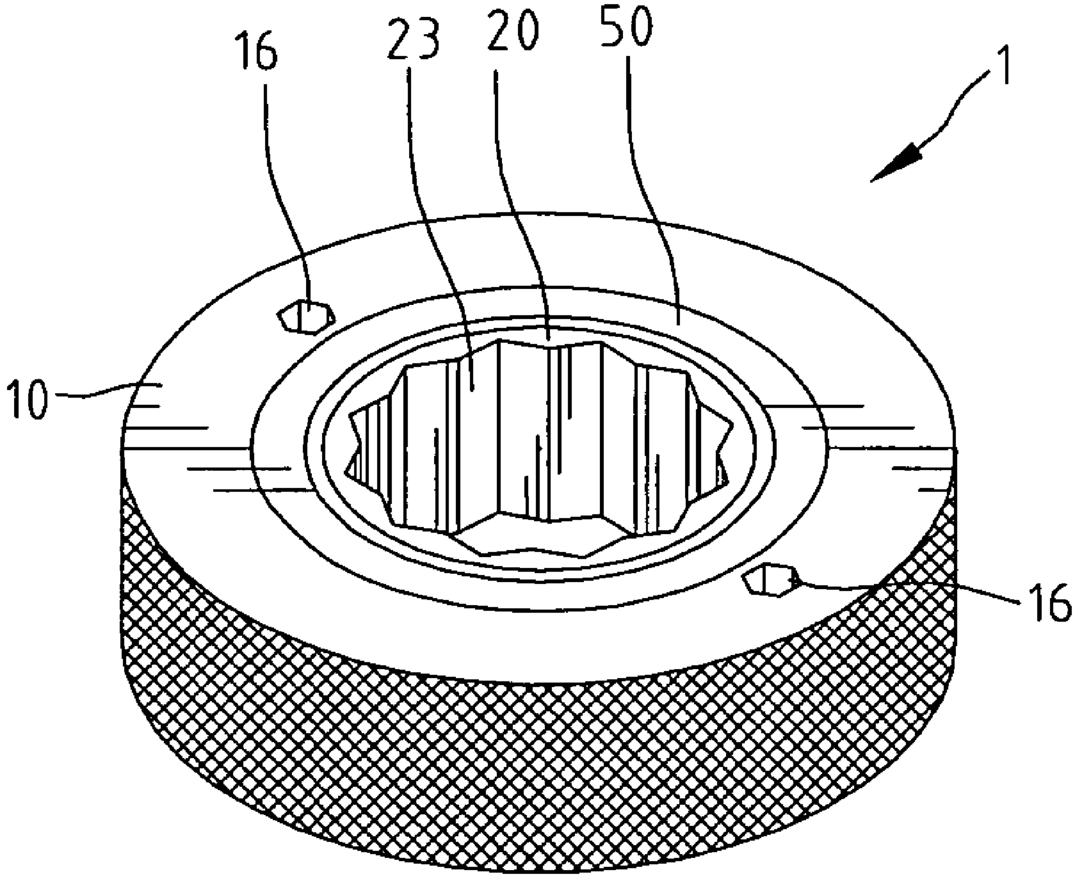
FIG. 2 is a perspective view of a wrench of the wrench assembly shown in FIG. 1.
Figure 3:
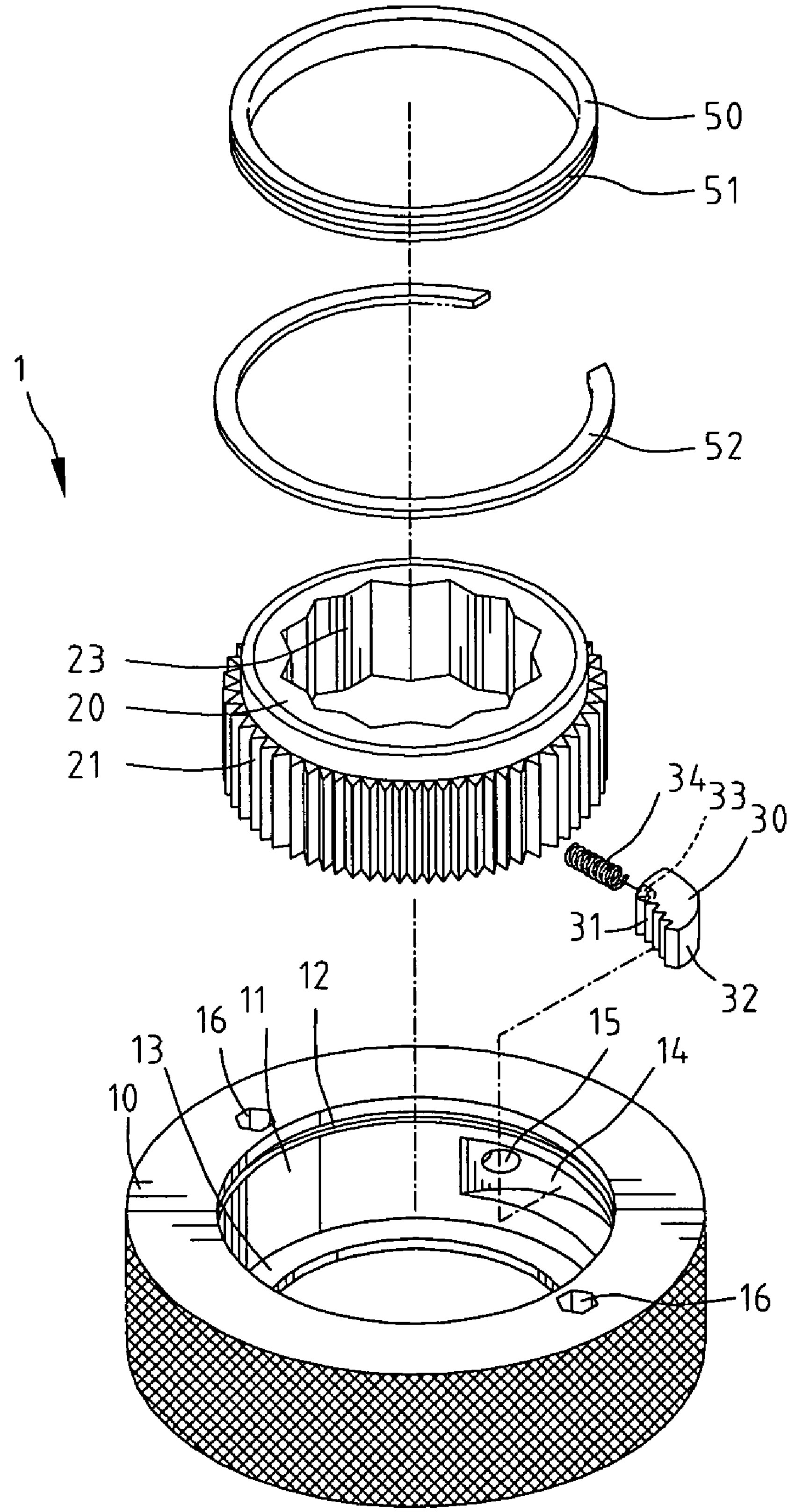
FIG. 3 is an exploded view of the wrench shown in FIG. 2.

Referring to FIGS. 1 and 2, a wrench 1 is similar to the wrench described in U.S. Patent Publication No. 2004-0187648 A. Therefore, the wrench 1 will not be in detail. Specifically, the wrench 1 includes a first annular ring 10 and a second sear 20 rotationally installed in the first annular ring 10.

The first annular ring 10 defines a space 11. The first annular ring 10 includes an internal side and an external side. First annular ring 10 includes an annular groove 12 defined in the internal side thereof, an annular flange 13 formed on the internal side thereof, a first recess 14 defined in the internal side thereof and a second recess 15 communicated with the first recess 14.

A toothed pawl 30 includes a toothed face 31 formed on an internal side thereof, an arched surface 32 formed at a first end thereof, and a recess 33 defined in a second end thereof. A spring 34 includes a first end fit in the recess 33 and a second end inserted in the recess 15 while the toothed pawl 30 is put in the recess 14.

The second sear 20 includes a toothed surface 21 formed on an external side and a non-circular surface 23 formed on an internal side thereof. The second sear 20 is put in the space 11 so that the toothed surface 21 is engaged with the toothed face 31.

A ring 50 includes an annular groove 51 defined in an external side. A C-ring 52 includes an internal edge put in the annular groove 51 and an external edge put in the annular groove 12, thus retaining the second sear 20 in the first annular ring 10. It, however, should be noted that the first annular ring 10 includes two apertures 16 defined therein.

Referring to FIG. 1, a handle 60 includes a head 61 defining a space 62, a ring 63 extending on the wall of the space 62 and defining an opening 64 communicated with the space 62, and two stems 65 projecting from the ring 63.

Figure 4:
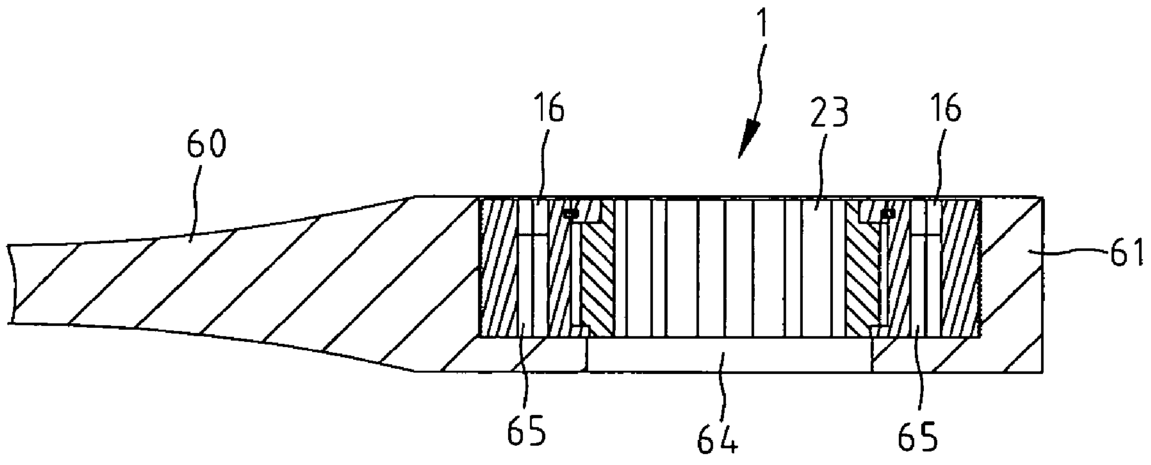
FIG. 4 is a cross-sectional partial view of the wrench assembly shown in FIG. 1.

Referring to FIG. 4, according to a first embodiment of the present invention, a wrench assembly includes the wrench 1 and the handle 60. The wrench 1 is put in the head 61 of the handle 60. The stems 65 are inserted in the apertures 16 defined in the first annular ring 10 of the wrench 1. Thus, the handle 60 is operable to rotate the wrench 1.

Figure 5:
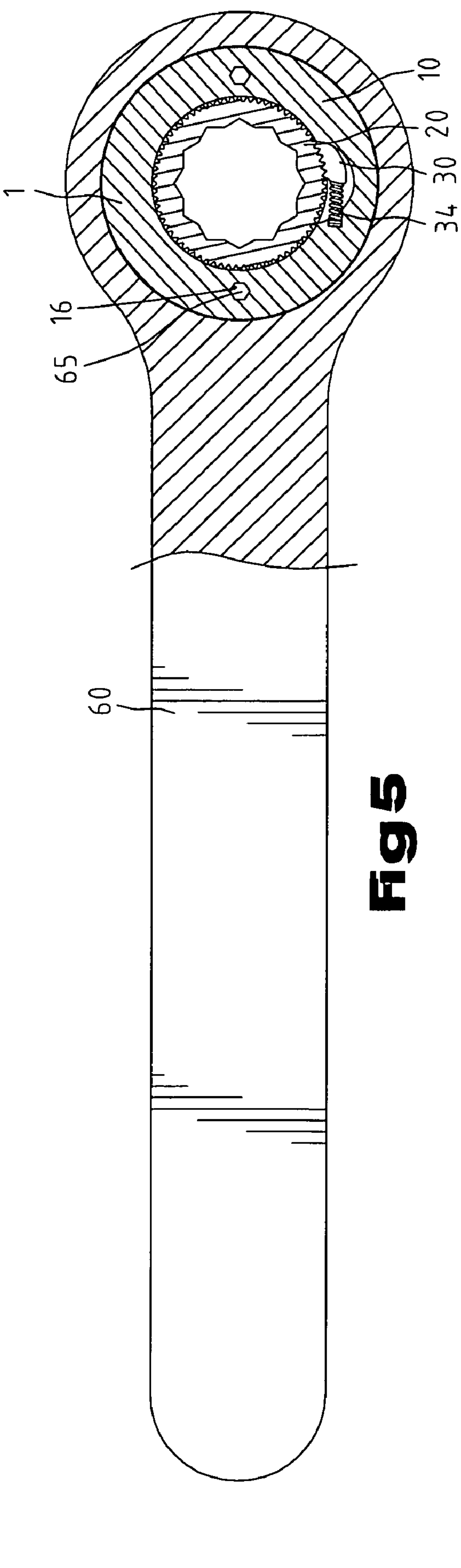
FIG. 5 is a cross-sectional partial view of the wrench assembly shown in FIG. 1 including a wrench of a first size.
Figure 6:
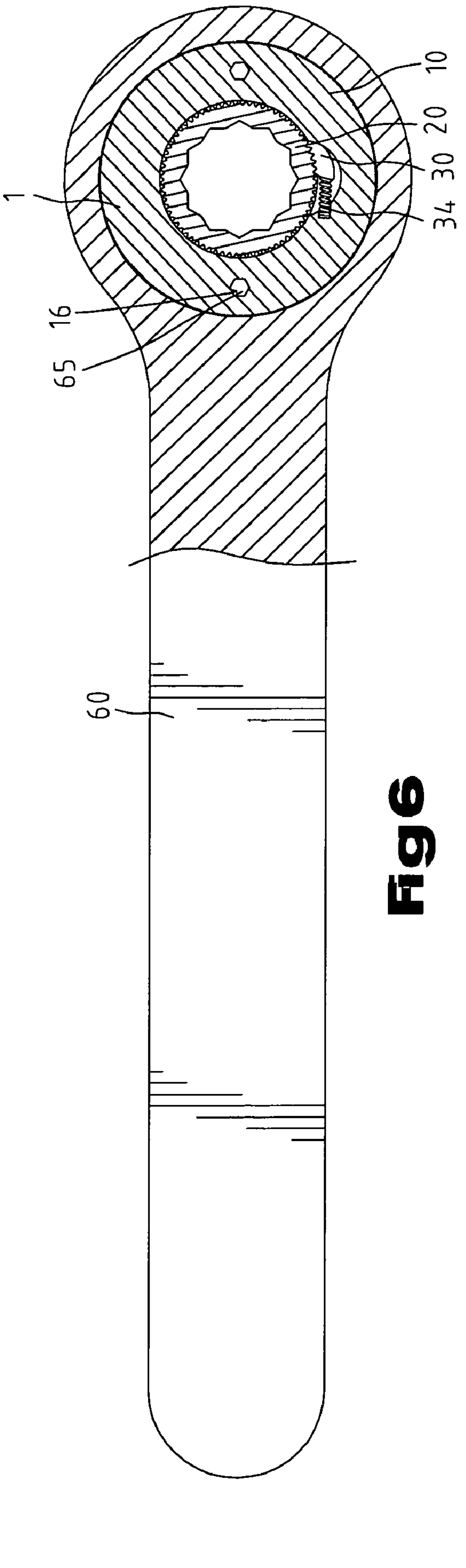
FIG. 6 is a cross-sectional partial view of the wrench assembly shown in FIG. 1 including a wrench of a second size.

Referring to FIG. 5, the wrench assembly includes a wrench 1 of a first size. Referring to FIG. 6, the wrench assembly includes a wrench 1 of a second size. The radial thickness of the first annular ring 10 shown in FIG. 5 is smaller than that of the first annular ring 10 shown in FIG. 6. Hence, the size of the second gear 20 shown in FIG. 5 is greater than that of the second gear 20 shown in FIG. 6. That is, the wrench assembly shown in FIG. 5 is operable to drive a larger bolt or nut (not shown) than the wrench assembly shown in FIG. 6.

Figure 7:
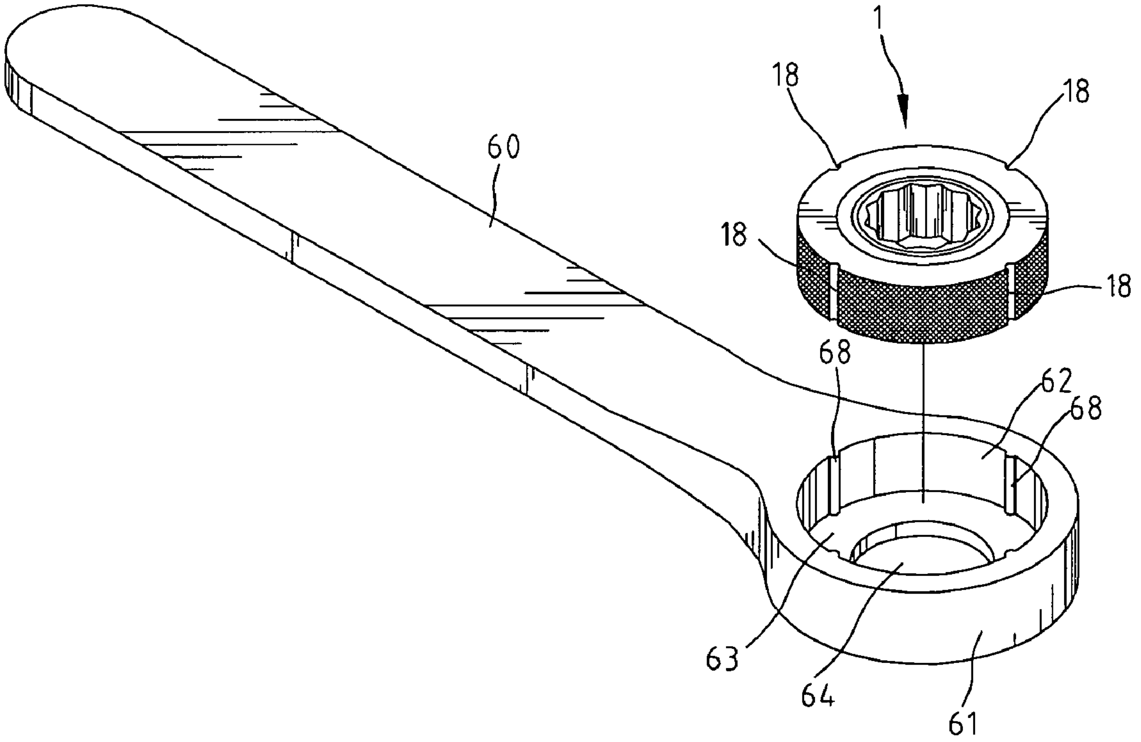
FIG. 7 is an exploded view of a wrench assembly according to a second embodiment of the present invention.

FIG. 7 shows a wrench assembly according to a second embodiment of the present invention. The second embodiment is similar to the first embodiment except for including ribs 68 extending on the wall of the space 62 of the head 61 instead of the stems 65 projecting from the ring 63 and for including grooves 18 instead of the apertures 16. As the wrench 1 is put in the head 61 of the handle 60, the ribs 68 are put in the grooves 18. Thus, the handle 60 is operable to rotate the wrench 1.

Figure 8:
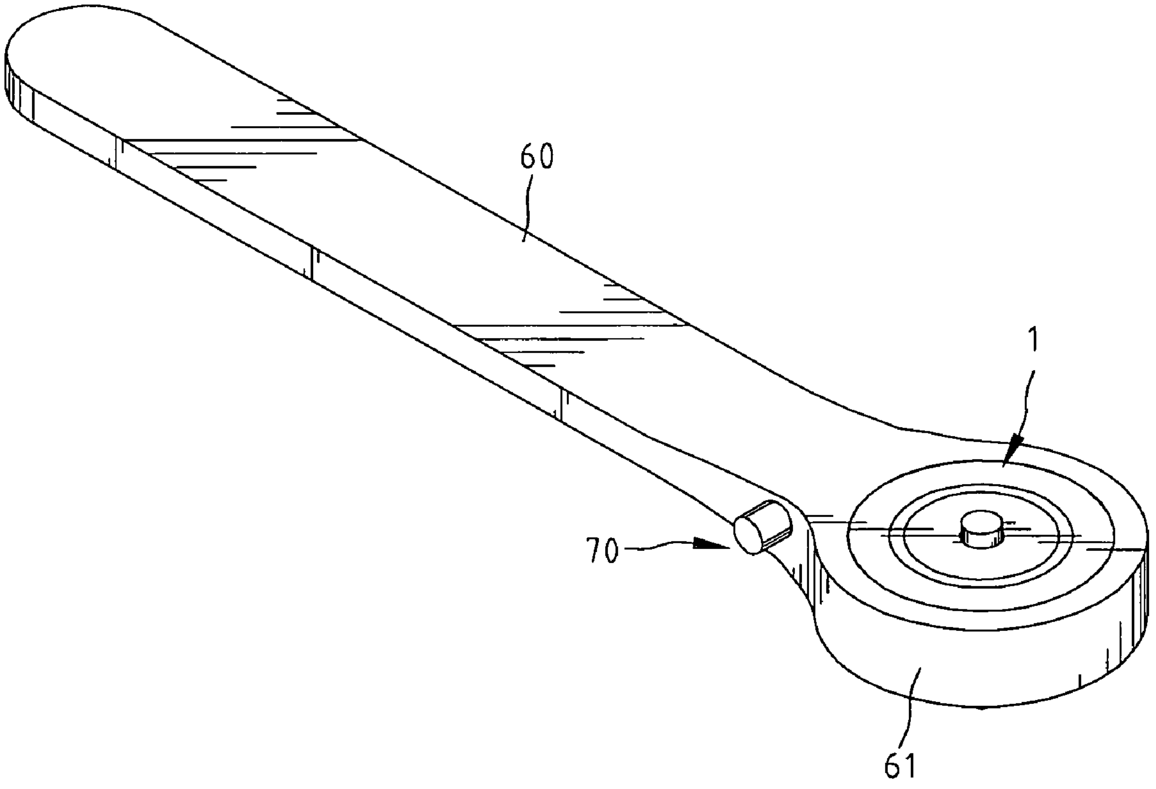
FIG. 8 is an exploded view of a wrench assembly according to a third embodiment of the present invention.

FIG. 8 shows a wrench assembly according to a third embodiment of the present invention. The wrench assembly includes a wrench 1 and handle 60. The wrench 1 includes a first annular ring 10 and a gear 25 (see FIG. 9). The first annular ring 10 of the third embodiment is like the first annular ring 10 of the first embodiment except for including a recess 17 instead of the apertures 16.

Figure 9:
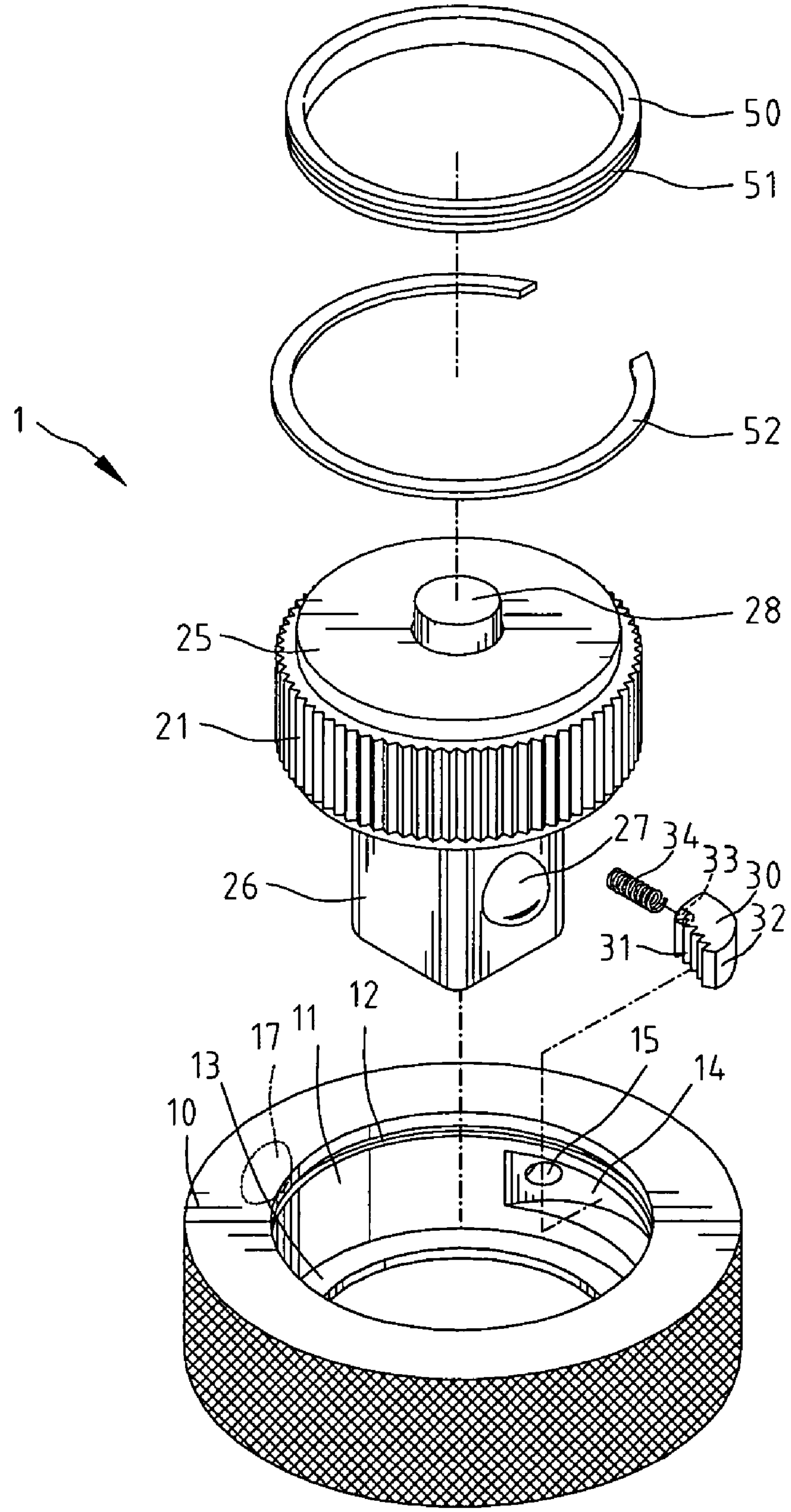
FIG. 9 is an exploded view of a wrench of the wrench assembly shown in FIG. 8.

Referring to FIG. 9, from the gear 25 extends an insert 26 for insertion in a socket (not shown) that can in turn be engaged with a bolt or nut (not shown). The gear 25 includes a detent 27 for contact with the socket and a switch 28 for control over the detent 27. The gear 25 is conventional and therefore will not be described in detail.

Figure 10:
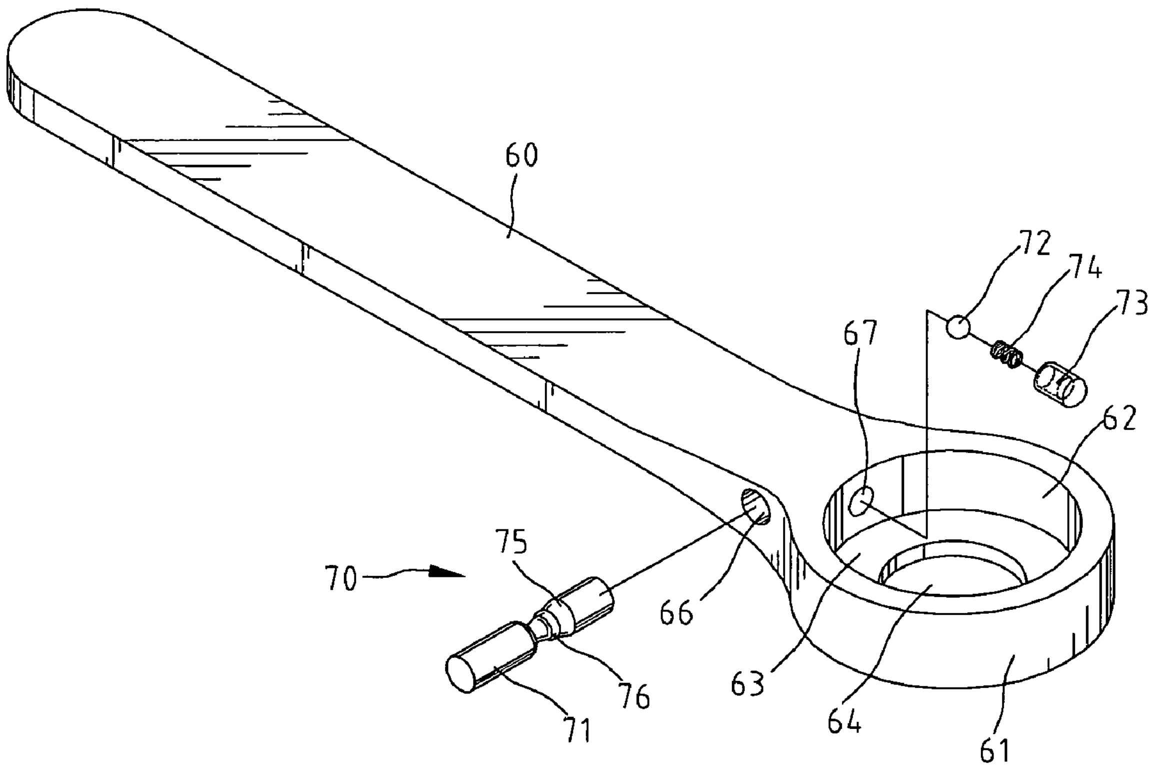
FIG. 10 is an exploded view of a handle.

Referring to FIG. 10, the handle 60 of the third embodiment is similar to the handle 60 of the first embodiment except for including a space 66 defined therein and a passage 67 through which the space 66 is communicated with the space 62.

Not like the first embodiment, the third embodiment includes a locking device 70 for locking the wrench 1 to the handle 60. The locking device 70 includes a detent 73 inserted in the passage 67, a spring 74 put in the detent 73, a ball 72 put against the spring 74 and a switch 71 inserted in the space 66. The switch 71 includes a shallow annular groove 75 and a deep annular groove 76.

Figure 11:
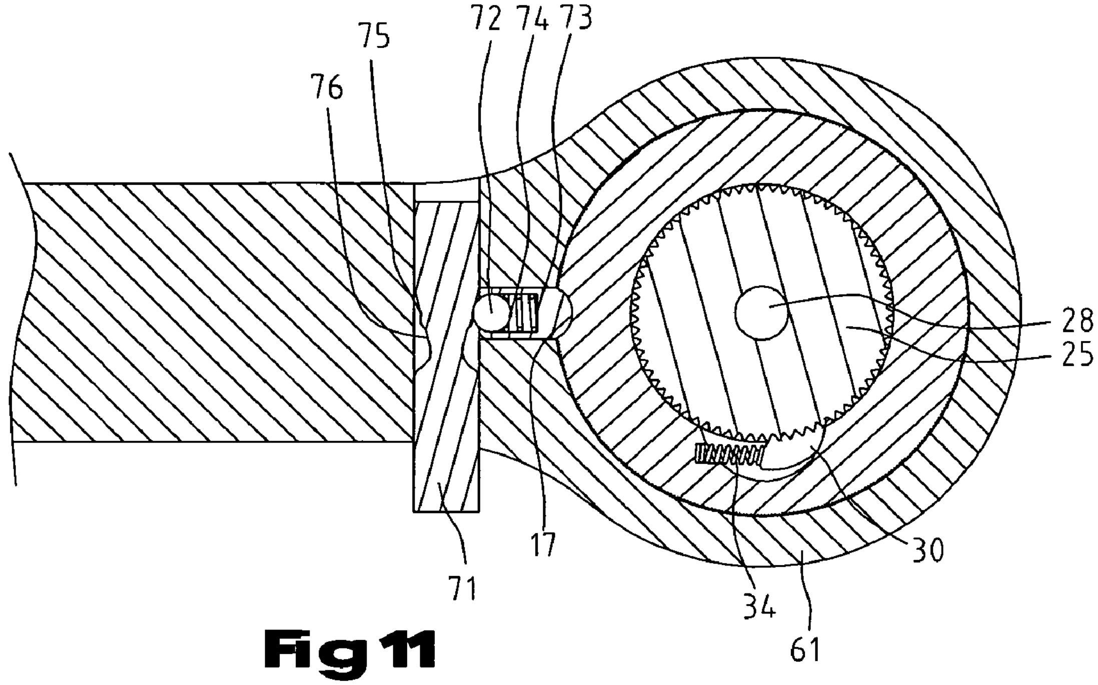
FIG. 11 is a cross-sectional partial view of the wrench assembly shown in FIG. 8.

Referring to FIG. 11, the ball 72 is put in the shallow annular groove 75 so that the detent 73 is trapped in the recess 17. The wrench 1 is hence kept in the head 61 of the handle 60.

Figure 12:
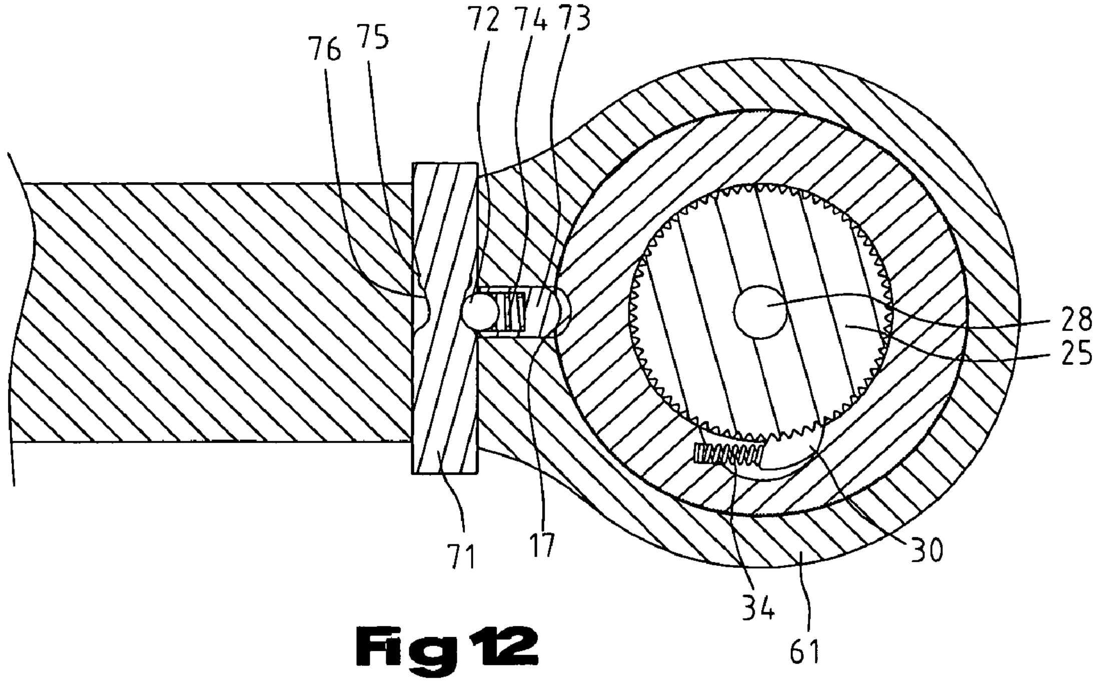
FIG. 12 is similar to FIG. 11 but shows the wrench assembly in a different position.

Referring to FIG. 12, the ball 72 is put in the deep annular groove 76 so that the detent 73 can be removed from the recess 17. The wrench 1 can be removed from the head 61 of the handle 60.

Figure 13:
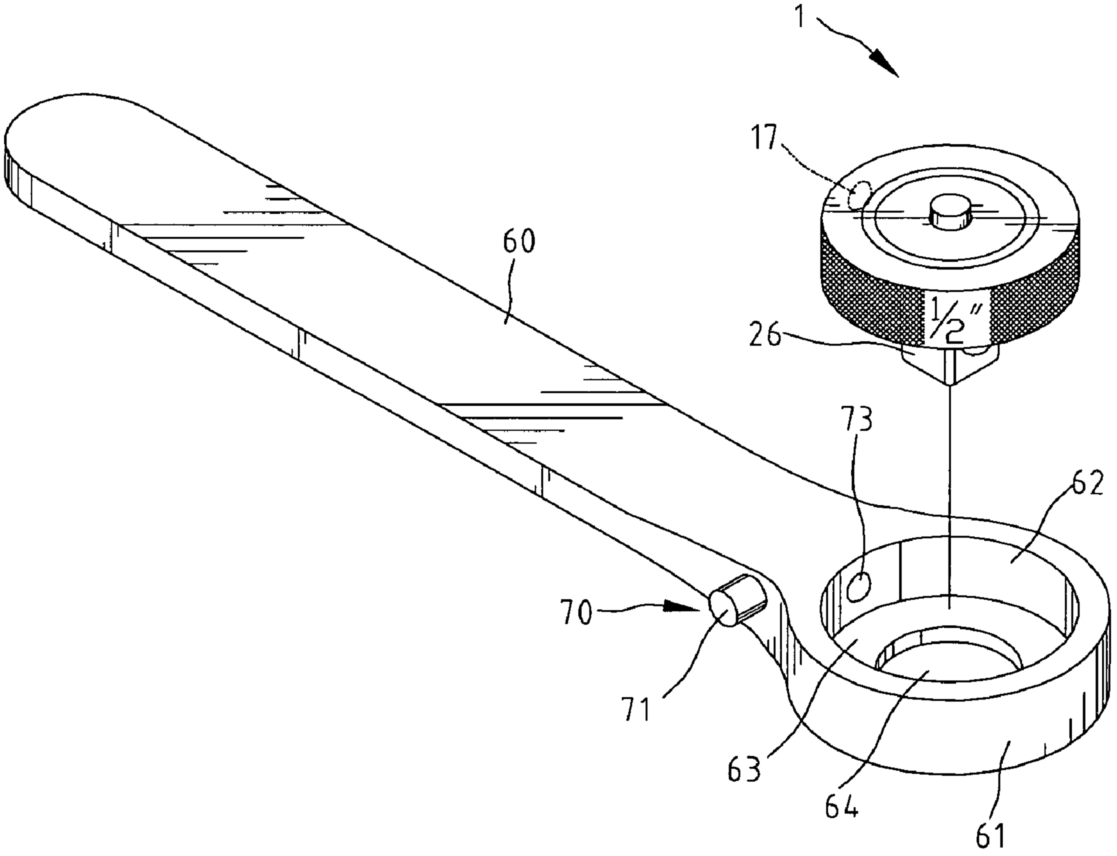
FIG. 13 is an exploded view of the wrench assembly shown in FIG. 8 including a wrench of a first size.

Referring to FIG. 13, the wrench assembly shown in FIG. 8 includes a wrench 1 and, more particularly, an insert 26 of a first size.

Figure 14:
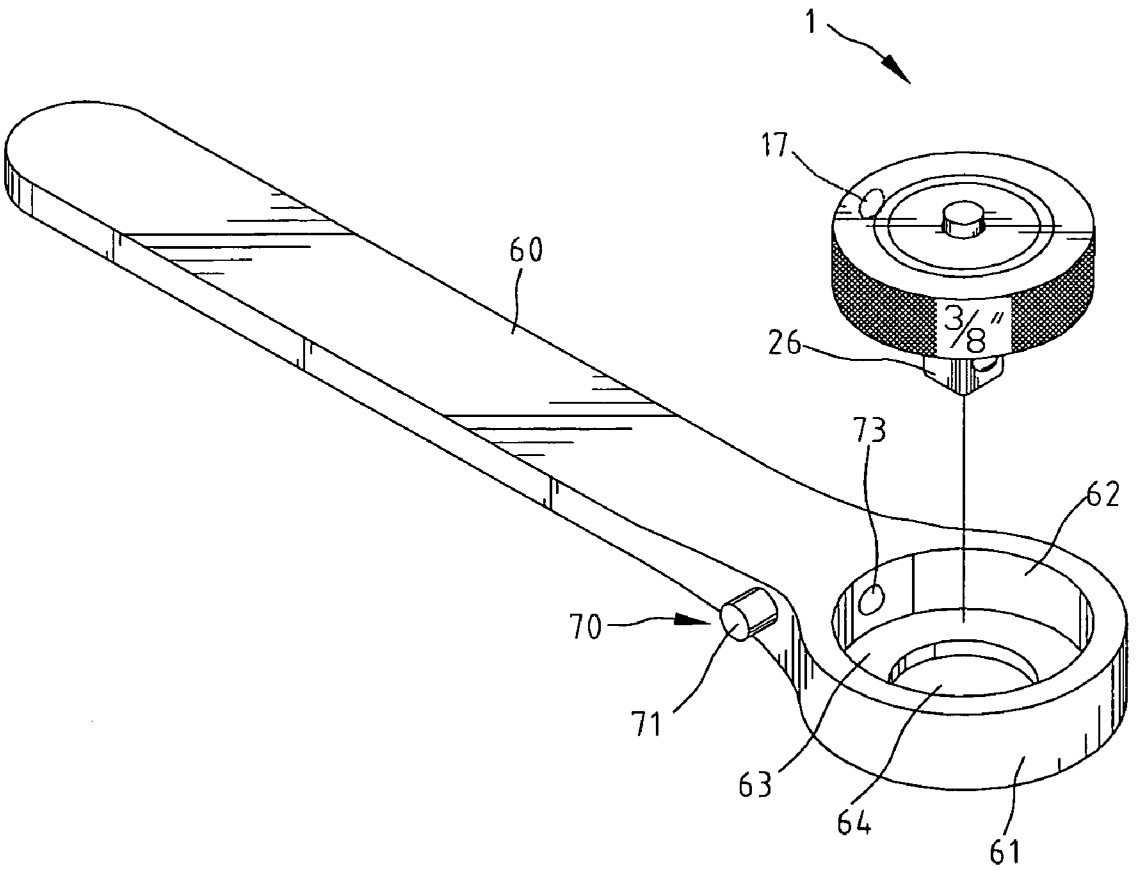
FIG. 14 is an exploded view of the wrench assembly shown in FIG. 8 including a wrench of a second size.

Referring to FIG. 14, the wrench assembly shown in FIG. 8 includes a wrench 1 and more particularly, an insert 26 of a second size.

Figure 15:
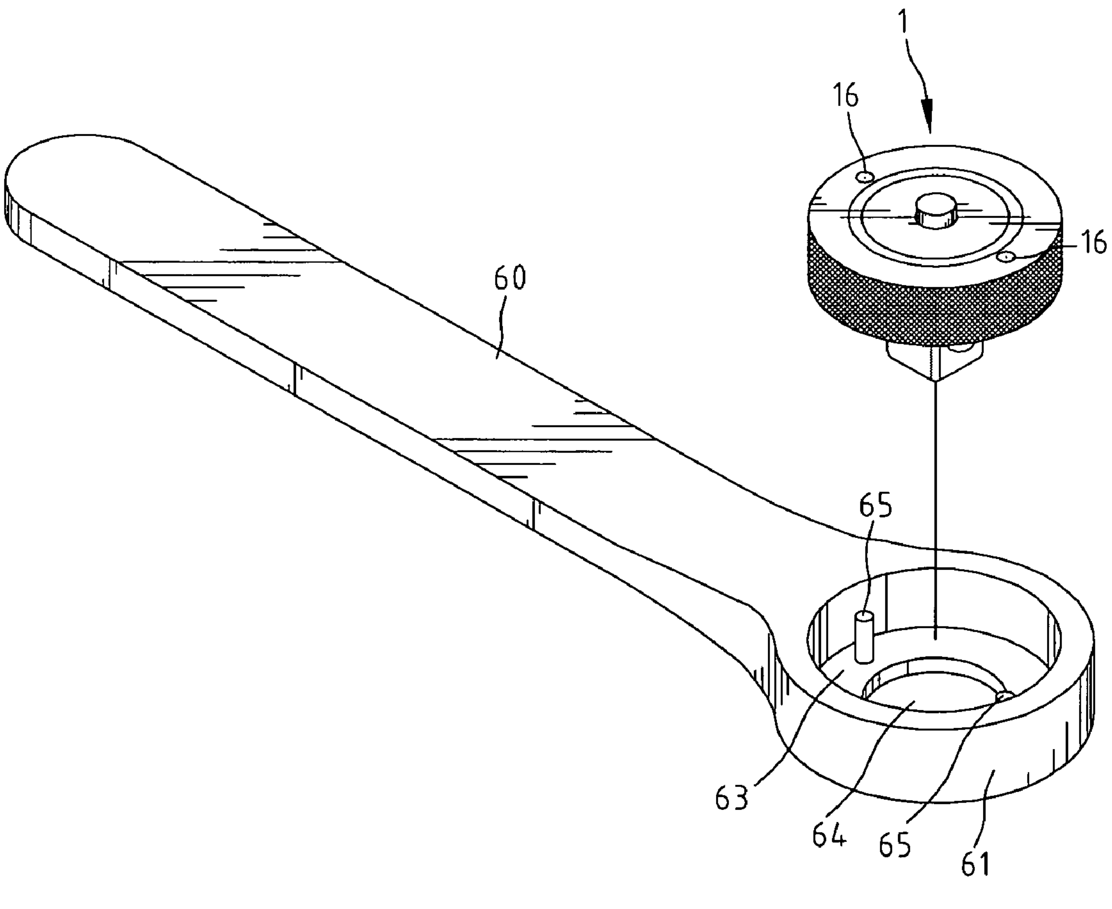
FIG. 15 is an exploded view of a wrench assembly according to a fourth embodiment of the present invention.

FIG. 15 shows a wrench assembly according to a fourth embodiment of the present invention. The fourth embodiment is similar to the third embodiment except that the first annular ring 10 includes the apertures 16 instead of a recess 17.

Figure 16:
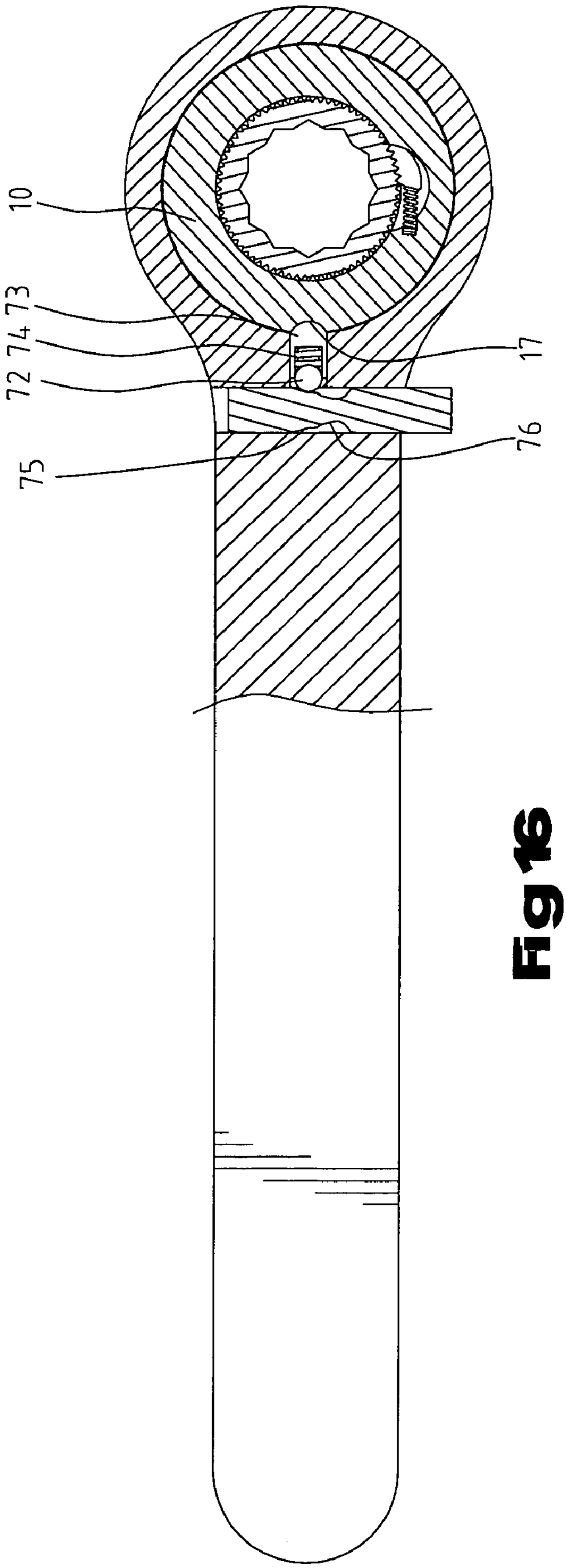
FIG. 16 is a partially cross-sectional view of a wrench assembly according to a fifth embodiment of the present invention.
Figure 17:
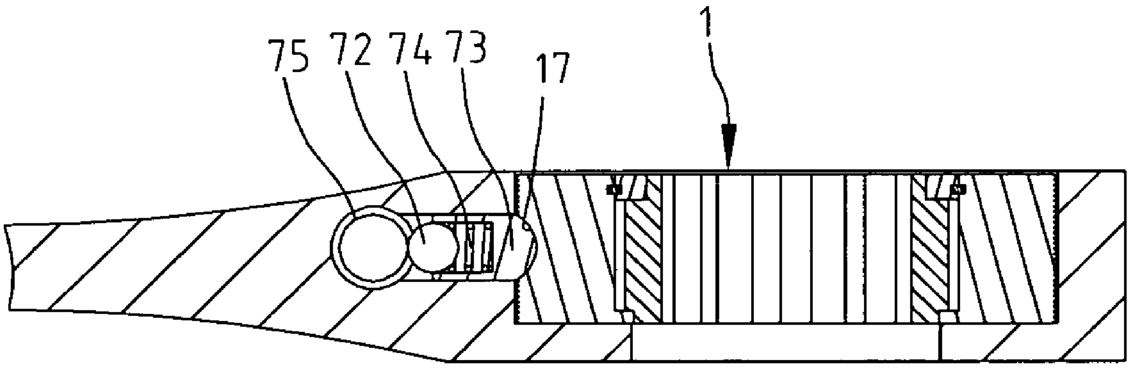
FIG. 17 is a cross-sectional partial view of the wrench assembly shown in FIG. 16.

FIGS. 16 and 17 show a wrench assembly according to a fifth embodiment of the present invention. The fifth embodiment is similar to the third embodiment except that the wrench 1 includes the second gear 20 instead of the gear 25.

Figure 18:
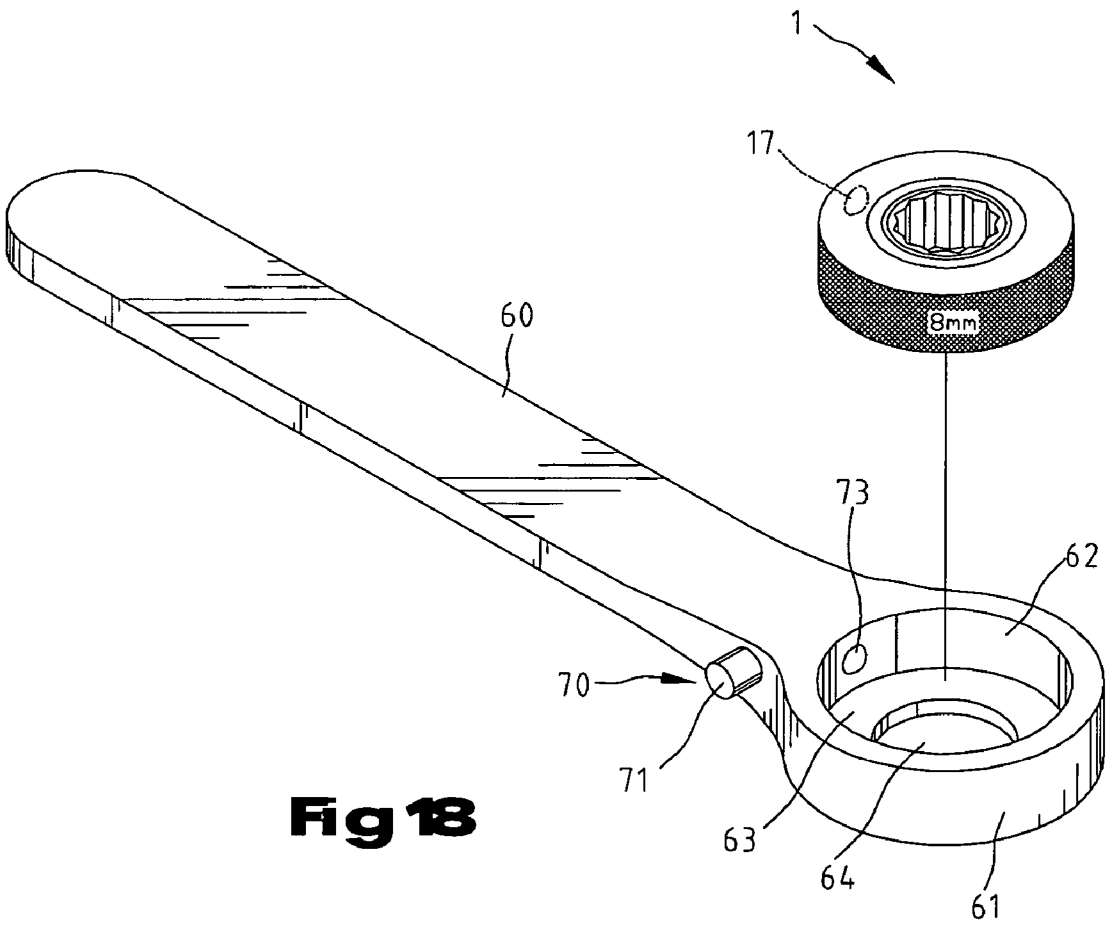
FIG. 18 is an exploded view of the wrench assembly shown in FIG. 16 including a wrench of a first size.

Referring to FIG. 18, the wrench assembly shown in FIG. 16 includes a wrench 1 of a first size.

Figure 19:
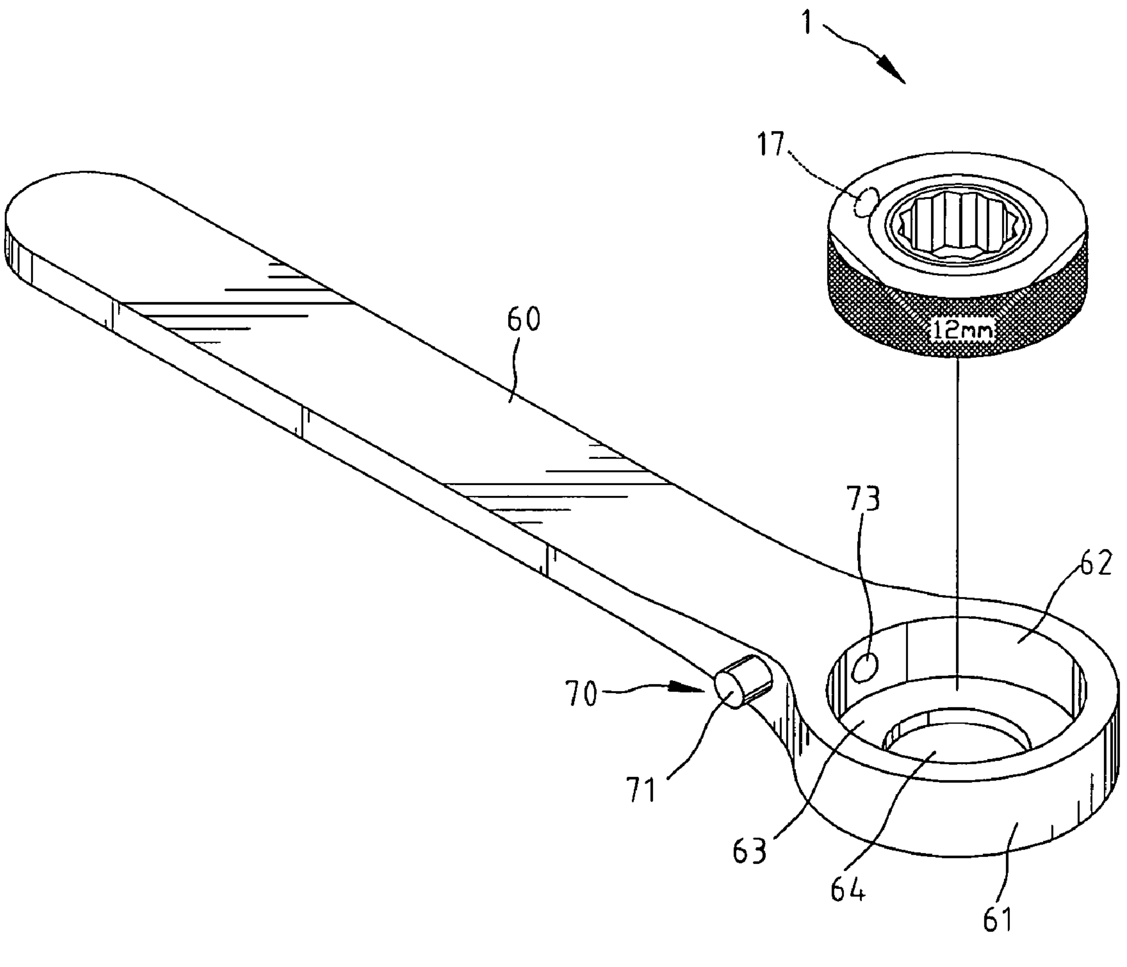
FIG. 19 is an exploded view of the wrench assembly shown in FIG. 16 including a wrench of a second size.

Referring to FIG. 19, the wrench assembly shown in FIG. 16 includes a wrench 1 of a second size.

The present invention has been described through detailed illustration of the embodiments. Those skilled in the art can derive variations from the embodiments without departing from the scope of the present invention. Hence, the embodiments shall not limit the scope of the present invention defined in the claims.

What is claimed is:

1. A wrench assembly comprising:

a handle comprising a head formed thereon; and a wrench comprising a first annular ring put non-rotationally in the head of the handle, a second gear rotationally installed in the first annular ring for engagement with a tool bit and a one-way driving device arranged between the first annular ring and the second gear so that the first annular ring can drive the second gear in a direction through the one-way driving device, wherein the handle comprises a ring extending on an internal side of the head and at least one stem projecting from the ring, wherein the first annular ring defines at least one aperture for receiving the at least one stem.

2. The wrench assembly according to claim 1 wherein the second gear comprises an annular configuration.

3. The wrench assembly according to claim 1 wherein the second gear comprises an insert for insertion in a socket.

4. The wrench assembly according to claim 3 wherein the wrench comprises a detent for contact with the socket.

5. The wrench assembly according to claim 4 wherein the wrench comprises a switch for control over the detent.

6. The wrench assembly according to claim 1 wherein the one-way driving device comprises a pawl for engagement with the second gear and a spring connected with the pawl and put in a recess defined in an internal side of the first annular ring.

7. The wrench assembly according to claim 6 wherein the second gear comprises a toothed surface, wherein the pawl comprises a toothed face for engagement with the toothed surface of the second gear.

8. A wrench assembly comprising:

a handle comprising a head formed thereon; and a wrench comprising a first annular ring put non-rotationally in the head of the handle, a second gear rotationally installed in the first annular ring for engagement with a tool bit and a one-way driving device arranged between the first annular ring and the second gear so that the first annular ring can drive the second gear in a direction through the one-way driving device, wherein the handle comprises at least one rib extending on an internal side of the head, wherein the first annular ring defines at least one groove for receiving the rib.

9. The wrench assembly according to claim 8 wherein the second gear comprises an annular configuration.

10. A wrench assembly comprising:

a handle comprising a head formed thereon;

a wrench comprising a first annular ring put non-rotationally in the head of the handle, a second gear rotationally installed in the first annular ring for engagement with a tool bit and a one-way driving device arranged between the first annular ring and the second gear so that the first annular ring can drive the second gear in a direction through the one-way driving device, wherein the first annular ring defines a recess; and a locking device which comprises a detent installed on the handle, with the recess receiving the detent, and wherein the locking device has a switch installed on the handle and movable between a locking position for keeping the detent in the recess defined in the first annular ring and a releasing position for allowing the removal of the detent from the recess defined in the first annular ring.

11. The wrench assembly according to claim 10 wherein the switch comprises a shallow annular groove for receiving the detent in the locking position and a deep annular groove for receiving the detent in the releasing position.

12. The wrench assembly according to claim 10 wherein the locking device comprises a spring provided between the detent and the switch.

13. The wrench assembly according to claim 12 wherein the locking device comprises a ball provided between the spring and the switch.

14. The wrench assembly according to claim 10 wherein the handle comprises a space defined therein for receiving the switch and a passage through which the space is communicated with a space defined in the head.

15. The wrench assembly according to claim 10 wherein the second gear comprises an annular configuration.

16. The wrench assembly according to claim 10 wherein the second gear comprises an insert for insertion in a socket.

17. A wrench assembly comprising:

a handle comprising a head formed thereon; and a wrench comprising a first annular ring put non-rotationally in the head of the handle, a second gear rotationally installed in the first annular ring for engagement with a tool bit and a one-way driving device arranged between the first annular ring and the second gear so that the first annular ring can drive the second gear in a direction through the one-way driving device, wherein the wrench comprises a C-ring with an external edge put in an annular groove defined in an internal side of the first annular ring in order to keep the second gear in the first annular ring.

18. The wrench assembly according to claim 17 wherein the wrench comprises a ring with an annular groove defined in an external side for receiving an internal edge of the C-ring in order to keep the second gear in the first annular ring.

19. A wrench assembly comprising:

a handle comprising a head formed thereon; and a wrench comprising a first annular ring put non-rotationally in the head of the handle, a second gear rotationally installed in the first annular ring for engagement with a tool bit and a one-way driving device arranged between the first annular ring and the second gear so that the first annular ring can drive the second gear in a direction through the one-way driving device, wherein the first annular ring comprises an annular flange formed on an internal side for supporting the second gear.

* * * * *